No. 708,616. Patented Sept. 9, 1902.
T. BEARMAN.
DITCHING MACHINE.
(Application filed Aug. 24, 1901.)
(No Model.) 2 Sheets—Sheet 1.
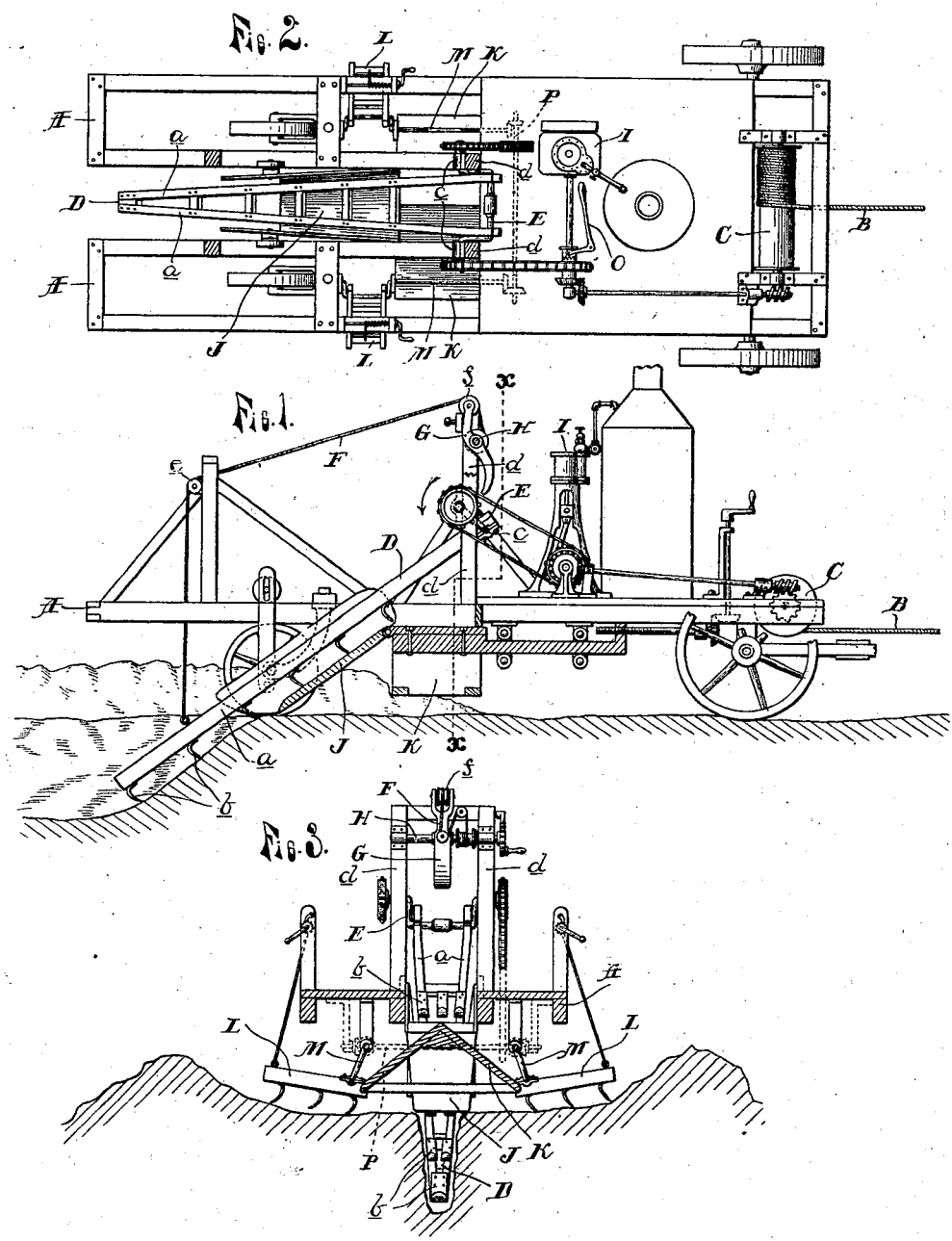
WITNESSES. INVENTOR.
Thomas Bearman
By E. J. Scully
Attorney.

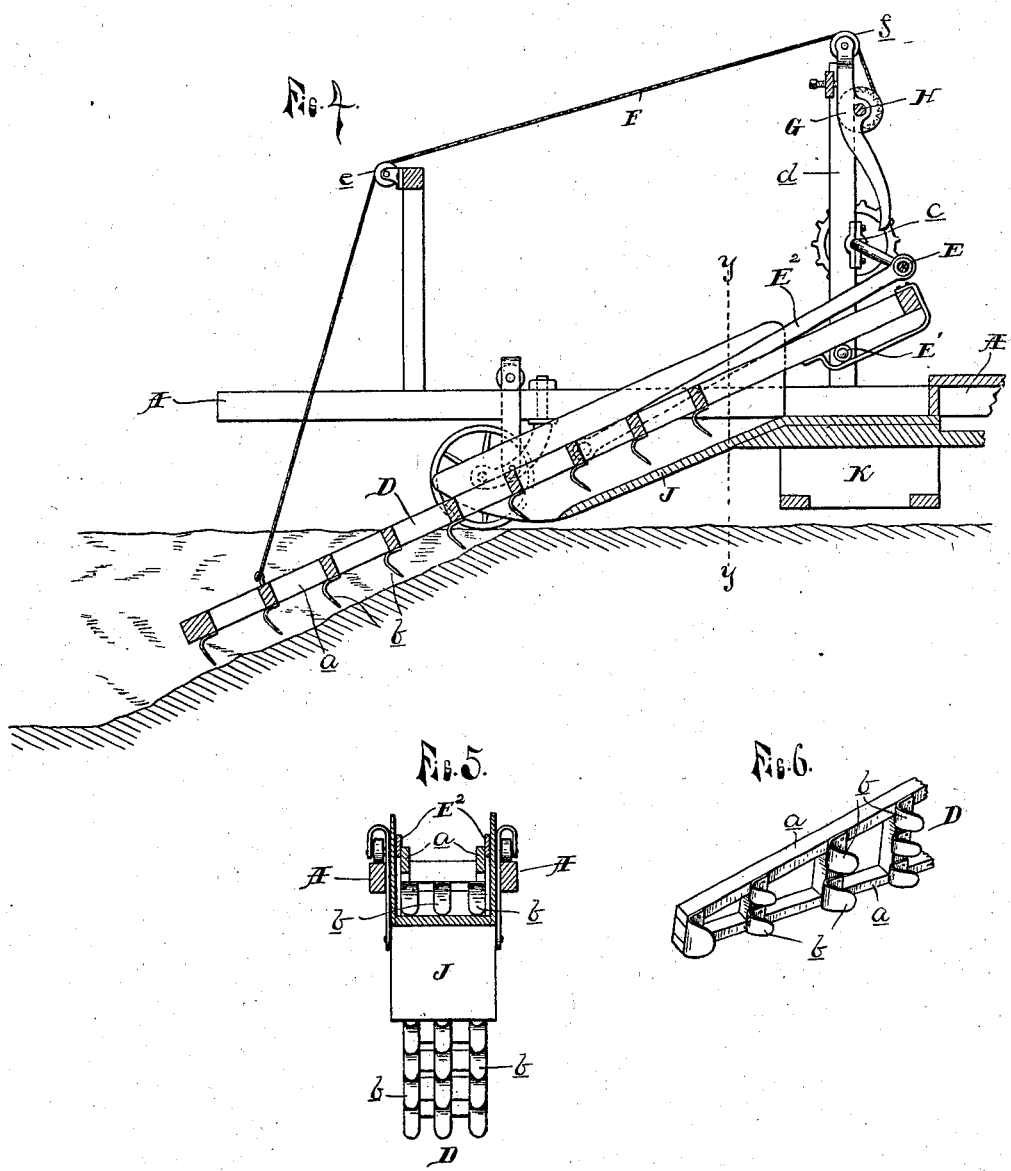

UNITED STATES PATENT OFFICE.

THOMAS BEARMAN, OF WINDSOR, CANADA.

DITCHING-MACHINE.

SPECIFICATION forming part of Letters Patent No. 708,616, dated September 9, 1902.

Application filed August 24, 1901. Serial No. 73,204. (No model.)

*To all whom it may concern:*

Be it known that I, THOMAS BEARMAN, a citizen of Canada, residing at Windsor, in the county of Essex and Province of Ontario, Canada, have invented certain new and useful Improvements in Ditching-Machines, of which the following is a specification.

This invention relates to that class of ditching-machines especially intended for digging trenches for laying tile and for other like work; and this invention has for its object to make a machine especially adapted to a variety of work comprised under the head of "ditching."

To this end my invention consists in the combination, arrangement, and operation of a new form of a mechanically-operated ditching-tool having the general character of a multiple of hoes attached to a single boom or handle and operating as a combined hoe and scraper by having a four-motion movement mechanically imparted to it, all as more fully hereinafter described, and shown in the accompanying drawings, in which—

Figure 1 is a side elevation of the machine, partly shown in vertical central section. Fig. 2 is a plan view with some of the minor details omitted. Fig. 3 is a cross-section substantially on line $x\ x$ in Fig. 1. Fig. 4 is a sectional elevation of part of the machine, showing a modified form of construction. Fig. 5 is a cross-section thereof on line $y\ y$. Fig. 6 is a perspective view of a section of one form of digging-tool which may be employed.

The machine has a suitable truck-frame A, supported on wheels, and is drawn over the ground in the line of the ditch by winding a cable B upon a winding-drum C, placed on the forward end of the truck. Within a longitudinal opening in this truck-frame is supported the digging-tool D, composed of a boom $a$ and a series of hoe-like blades $b$, fastened onto it. The boom may be a ladder-like wooden frame with two side bars, which may either converge, as shown in plan in Fig. 2, or which may be parallel to each other, as shown in Figs. 4 and 5. The hoe-blades may extend clear across, or each may be composed of a number of smaller blades, as shown in Fig. 6, and in case the converging form of digging-boom is employed the hoes grow larger—that is, their width increases with the width of the boom toward the wider end. This digging-tool is held in an inclined position in the opening in the truck-frame by having its upper end supported in bearings $c$ upon a revolving crank-shaft E, which is journaled transversely upon suitable uprights $d$ of the frame, and by means of a cable or rope F, which fastens onto the opposite end of the boom and passes over a pulley $e$, supported upon the frame above the rear end, thence over a pulley $f$, supported in the free upper end of an oscillating lever G to a winding-shaft H, by means of which the cable may be lengthened or shortened by turning said shaft for the purpose of raising or lowering the digging end of the tool. The crank-shaft is revolved by motive power derived through any suitable drive connection from a steam-engine I, supported upon the frame, or from any other suitable source of power, and this shaft in revolving carries the upper end of the digging-boom in a circular path, while at the same time at every revolution the crank strikes the end of the lever G and imparts an oscillating motion to it, which through the cable F is transmitted to the lower end of the digging-boom, which thus acquires a so-called "four-motion" movement—that is, an up-and-down and a forward-and-rearward movement, or what may be called a "combined hoe and scraper" action. The earth may be discharged outside upon the ground alongside the ditch by setting the hoes at a slight angle sufficient to cause a lateral discharge; but I preferably secure in the opening of the frame below the digging-tool a suitable trough J, which serves as a conveyer-trough for the portion of the digging-tool above ground. This trough has the same incline as the digging-boom and reaches down to the ground, so as to receive the dirt as it is removed by the hoes from the ditch and carry it to a lateral discharge-spout fastened to its upper end. For ordinary tile-trenching I provide the trough with a mere saddle K, the inclines of which equally divide the dirt to both sides. The incline of the digging-boom can be varied by lengthening or shortening the rope F, and the depth of the ditch can be increased or diminished thereby.

The boom L carries hoes like the ditching-boom and operates at right angles to the ditch near the ground, whereby the revolutions of the crank impart a four-motion movement to the boom and cause the shovels thereof that scrape the dirt deposited by the saddle upon the ground to be carried farther outward. By elevating the outer end of the boom L more or less the distance to which the dirt will be thrown can be regulated.

Motion may be imparted to the different parts of the operating mechanism in any convenient manner. As shown in the drawings, motion is imparted from the engine-shaft to the crank-shaft E by chain-and-sprocket gear, and the winding-drum C is operated by worm-gear in the usual manner, all under control of a lever O for throwing the parts in or out of gear. Motion is communicated also from the crank-shaft E through a chain and sprocket gear to a counter-shaft P, transversely journaled below the frame and from which motion is carried to the crank-shafts M, which operate the booms L.

My machine employs a very simple ditching-tool which may be either so constructed that it can be readily converted to incline the side bars under various angles to each other or into parallelism with each other, as may be desired, to dig trenches with vertically-standing walls or with more or less inclined walls. The preferable way would be, however, to provide different tools, according to the desired cross-section of the trench.

In the modification shown in Figs. 4 and 5 I show a ditching-boom in which the sides are in parallelism, and which therefore digs a trench with vertical walls, and instead of having the upper end of the boom directly journaled upon the crank-shaft E it is guided upon a cross-bar E', and motion is conveyed to it from the crank through connecting-bars $E^2$.

It is to be understood that my machine will be provided with such other known appliances for steering, hauling, and handling it as are commonly used in other machines of this character.

What I claim as my invention is—

1. In a ditching-machine the combination with a supporting-frame mounted upon wheels of a ditching-boom provided with a plurality of hoe or scraper blades fixedly secured thereto at intervals along the under side thereof and extending transversely thereof and carrying means freely supporting said boom in an opening of the frame longitudinally thereof and inclined at an angle to the ground, said carrying means comprising a revolving crank-shaft journaled transversely of the frame and upon which the forward end of the boom is supported above ground free to follow the motion of said crank and a chain or rope supporting the rear end of said boom below the surface of the ground free to rise and fall and having a conjointed movement with the crank to impart to said boom a continuous operative four-motion movement.

2. In a ditching-machine, the combination with a supporting-frame mounted upon wheels of a ditching-boom provided with a plurality of hoe or scraper blades secured thereto at intervals along its under side and extending transversely thereof, and carrying devices movably supporting said boom in an opening of the frame in a longitudinal vertical plane inclined at an angle to the ground said carrying devices comprising a revolving crank-shaft journaled upon the forward part of the frame and supporting the forward end of the frame free to revolve with said crank-shaft at some distance above the ground and a chain or rope supporting the rear end of said boom at a distance below the ground free to rise or fall with the movement of said chain or rope, said rope or chain having a concerted movement with the crank-shaft to impart to the boom a continuous four-motion movement and provided with means for lengthening and shortening it.

3. In a ditching-machine, the combination of the supporting-frame having a central longitudinal opening and supported upon wheels, the ditching-boom movably supported in said opening at an angle with the ground and provided with a series of scraper-blades along its under side, the revolving crank-shaft journaled transversely above the frame and supporting the front end of the boom above the ground, the chain or rope from which the rear end of said boom is supported from the frame below the surface of the ground, the oscillating lever mounted upon the crank-shaft in the path thereof and to which the chain or rope is connected for imparting movement to said rope, the conveyer-trough independently adjustably supported on the frame below the ditching-boom and means for adjusting said ditching-boom and conveyer-trough upon different inclines with the ground.

4. In a ditching-machine, the combination with a supporting-frame mounted upon wheels of a four-motion ditching-boom centrally supported in a longitudinal vertical plane in the opening of the frame at an incline to the ground and provided upon its under side with a series of scraper-blades for cutting the ditch by the motion of the boom, and two lateral booms supported from the frame at right angles thereto at opposite sides and in the path of the dirt thrown out by the ditching-boom, said lateral booms provided with scraper-blades upon their under side and having a concerted four-motion movement with the ditching-boom.

In testimony whereof I have affixed my signature in presence of two witnesses.

THOMAS BEARMAN.

Witnesses:
 M. E. SCULLY,
 T. SCULLY.